(## United States Patent
Sharma

[11] 3,847,675
[45] Nov. 12, 1974

[54] INSULATING SEAL FOR MOLTEN SALT BATTERY
[75] Inventor: Ram A. Sharma, Sterling Heights, Mich.
[73] Assignee: General Motors Corporation, Detroit, Mich.
[22] Filed: Nov. 28, 1972
[21] Appl. No.: 309,959

[52] U.S. Cl. .............. 136/133, 136/83 T, 136/64 F
[51] Int. Cl. ........................................... H01m 1/02
[58] Field of Search ........ 136/86 F, 83 T, 153, 133, 136/64 F

[56] References Cited
UNITED STATES PATENTS

| | | |
|---|---|---|
| 3,120,456 | 2/1964 | Broers................................. 136/153 |
| 3,723,186 | 3/1973 | Borucka et al. ..................... 136/153 |
| 2,927,951 | 3/1960 | Lindstrom........................... 136/153 |
| 3,528,856 | 9/1970 | Ovshinsky........................ 136/83 T |

Primary Examiner—Winston A. Douglas
Assistant Examiner—H. A. Feeley
Attorney, Agent, or Firm—Lawrence B. Plant

[57] ABSTRACT

An inter-electrode insulating seal comprising lithium fluoride for use with high temperature batteries having lithium fluoride-saturated molten salt electrolytes. Means are provided for mitigating the thermal expansion characteristic of lithium fluoride.

2 Claims, 2 Drawing Figures

)

PATENTED NOV 12 1974    3,847,675

3,847,675

INSULATING SEAL FOR MOLTEN SALT BATTERY

BACKGROUND OF THE INVENTION

This invention relates to insulating seal for molten salt electrochemical cells having highly reactive ingredients forming their electrochemical couples. Molten salt electrolyte galvanic cells having anode and cathode materials coupled from opposite ends of the periodic table have excellent potential as high energy and high power portable sources of electricity. Included among such cells are those having anodic materials taken from the group I-A light metals (e.g., Li and Na) and cathodic materials taken from the group VI-A and group VII-A non-metals (e.g., S and $Cl_2$).

Among the problems of high temperature cells, such as the above, is compatibility between the several materials from which a cell is constructed. The materials must be joinable to each other to form and maintain hermetic joints over broad temperature ranges and under thermal cycling conditions. Moreover materials selection is further hampered by the fact that the highly reactive, corrosive, nature of the cell reactants create a chemical incompatibility between the reactants and most construction materials. The above problems are particularly acute where electrolyte-contacting insulating seals are needed to hermetically seal the cell and electrically isolate the cell's electrodes. An insulating seal material is needed which has thermal compatibility with the other cell construction materials and chemical compatibility with both extremes of the periodic table. The material selected must be strong, electrically non conductive and have thermal expansion properties compatible with the other materials of construction. In the case of a $Li-Cl_2$ cell, for example, these other materials would typically comprise stainless steel and carbon or graphite. Considering the possible candidates for a seal material, one finds that some metal oxides are not attacked by chlorine but become conductive or degrade in the presence of lithium chloride containing dissolved lithium. One further finds that aluminum nitride is fine in the presence of lithium chloride containing dissolved lithium but is vulnerable to chlorine attack. Metals and carbon do not have the requisite insulating properties. Similar problems are encountered in the other highly reactive electrochemical cells, e.g., the lithium-sulfur cell.

Experienced workers in the art have been frustrated to find that materials which resist the chemical environment are usually not good insulators and/or have poor thermal compatibility and conversely materials which are good insulators and have acceptable thermal compatibilities are not resistant to the chemical environment. Some have suggested locally freezing some of the cell's electrolyte to form an insulating seal, but this requires complex cooling equipment and wastes system energy. Other workers have resorted to complex seal and conductor arrangements such as disclosed in Craig U.S. Pat. No. 3,575,720, issued Apr. 20, 1971.

It is an object of this invention to provide an electrically insulating seal which is chemically compatible with highly reactive/corrosive cell reactants and can be rendered thermally compatible with the other cell construction materials.

This and other objects and advantages of this invention will become more apparent from the detailed discussion which follows in which.

Figure 1:
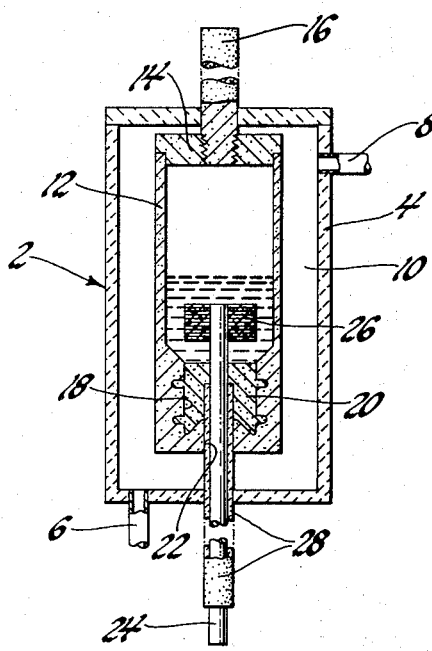
FIG. 1 is a sectioned side elevational view through a $Li-Cl_2$ fused salt cell utilizing the seal of the present invention.

According to the present invention an insulating seal comprises lithium fluoride and a means for mitigating thermal expansion of the lithium fluoride. The seal is used in a fused salt electrolyte cell in which the electrolyte is saturated with lithium fluoride. In a preferred embodiment, lithium fluoride powder is hot-pressed in situ between the electrodes to be joined. The lithium fluoride powder is hot-pressed and compacted under heat and pressure to tack the particles together into a rigid mass having a plurality of interparticle bonds sufficient to hold the mass together but which is replete with intergranular slip planes along substantial portions of the grain boundaries. Some grain growth occurs in the process. The mass is sintered under enough heat and pressure to densify it and give it strength, but not enough to cause the grains in the mass to be completely immobilized against relative movement under the thermal stresses encountered in molten salt cells. The materials in this class have superficial hardness of less than about 71 on the Rockwell 15 W scale. The compact has some microporosity, though it is preferably as near the theoretical density of lithium fluoride (i.e., 2.64 g/cc) as is possible. Some porosity is tolerable so long as it is not so excessive as to permit electrolyte from leaking through the pores. The seal is used with a molten salt electrolyte which is saturated with lithium fluoride to maintain the integrity of the seal against dissolution at cell operating conditions. The plurality of interparticle slip planes and slightly microporous nature of the seal thusly made is a convenient means for mitigating the effects of lithium fluoride's high thermal expansion property. The slip planes and microporosity apparently permit the particles to shift relative to each other so as to relieve any directional stress in the mass.

Some of the advantages of lithium fluoride as a seal material are: (1) its high melting point relative to the electrolyte; (2) its inertness to corrosive attack; (3) its high decomposition potential which precludes the dissolved lithium fluoride from interfering with the cell's reaction; (4) its ability to be hot-pressed into a cohesive mass having intergrain mobility under stress; (5) its increased plasticity at elevated temperatures (i.e., above about 350°C.); and (6) its ability to bond well to dissimilar materials such as stainless steel and particularly carbon/graphite and retain that bond over broad temperature ranges.

Other means to mitigate the effects of thermal expansion include the use of inert fillers in admixture with the lithium fluoride mix and/or mechanical means, such as buffer layers, between the lithium fluoride and the other cell construction materials. Hence, as an alternative to the use of slip planes and a microporous mass for mitigating the effects of thermal expansion, inert fillers comprising such material as $Y_2O_3$, $La_2O_3$, AlN, $L_1AlO_2$ and $CaZrO_3$ may be added to the lithium fluoride before hot pressing. The use of fillers gives a considerable amount of flexibility to the cell designer in tailoring the thermal expansion properties of the seal to meet his needs. When fillers are used to mitigate thermal expansion, the lithium fluoride-filler mix can be heated above the fusion temperature of lithium fluoride to fuse the materials into a solid mass. As much as 85 weight percent by weight filler has been used with the lithium fluoride apparently acting as a binder for the filler as well as a protective layer therefor. The only seeming requirement for the composition of the filler material is that it be inert at least to the extent of not reacting with the cell ingredients to form a salt which, coupled with lithium fluoride, produces a low melting binary salt mixture. For precisely this reason AlN is not considered inert to a chlorine containing system but would be acceptable in other systems, e.g., lithium-sulfur. AlN-filled lithium fluoride seals have been used in chlorine containing cells when additional means were provided to prevent direct contact between the chlorine and the AlN.

An important consideration with the use of lithium fluoride insulating seals is to insure against its dissolution into the fused salt electrolyte upon contact therewith. According to the present invention, the integrity of the lithium fluoride seal is maintained by saturating the electrolyte with lithium fluoride thereby establishing an equilibrium condition between the seal and the electrolyte which prevents dissolution of the lithium fluoride. In the event a cell should overheat to a point where the electrolyte is no longer saturated with lithium fluoride, some of the lithium fluoride seal surface will dissolve to reestablish the equilibrium condition. I prefer, however, to provide an extra amount of lithium fluoride (i.e., beyond saturation) in the electrolyte to insure that a non-saturated condition does not occur.

In one form of the invention, the seal is formed by hot-pressing reagent grade lithium fluoride powder into a microporous coherent mass having a density of at least about 2.5 g/cc and preferably at least about 2.6 g/cc. The particles are hot pressed in situ between the elements to be sealed, i.e., the electrodes. The particle size does not appear to be particularly critical. In this regard, successful seals have been made by hot pressing Fisher reagent grade lithium fluoride as it is sold by Fisher. Other successful seals have been made by fusing Fisher reagent grade lithium fluoride (a fluffy material) into a solid mass and then hand grinding it, using a mortar and pestle, followed by ball milling it. These particles are much larger than the fluffy powder in the, as purchased, condition.

FIG. 1 shows a Li-$Cl_2$ cell 2 comprising a quartz housing 4 having a chlorine inlet 6 and outlet 8. A chlorine atmosphere is maintained in the region 10 by flowing chlorine gas through the cell. The cell's electrodes and electrolyte are arranged in the region 10. A cylinder 12 of porous graphite is the chlorine electrode and also holds the lithium fluoride saturated electrolyte (e.g., LiCl or LiCl-KCl). The top of the cylinder 12 has a dense graphite cap 14 for closing off the cylinder. A graphite stud 16 extends from the cap 14 out of the housing 4 and is the external electrical lead from the chlorine electrode 12. A well 18 is provided at the bottom of the cylinder 12 to receive and contain the lithium fluoride seal 20. A bore 22 extends through the bottom of the cylinder 12 and into the well 20 and is adapted to receive a stainless steel rod 24 which is the electrical lead to the lithium electrode 26. A ceramic sheath 28 of impervious $Al_2O_3$ surrounds the rod 24 and protects it from the chlorine in region 10, and electrically insulates it from the bottom of the cylinder 12. A lithium storage electrode 26 is coupled to the rod 24 and positioned in the electrolyte is shown. The electrode 26 is preferably of the porous metal matrix type for holding liquid lithium within its interstices by capillary action. One such electrode is disclosed in Craig U.S. Pat. No. 3,560,265, issued Feb. 2, 1971, and assigned to the assignee of the present invention.

Figure 2:
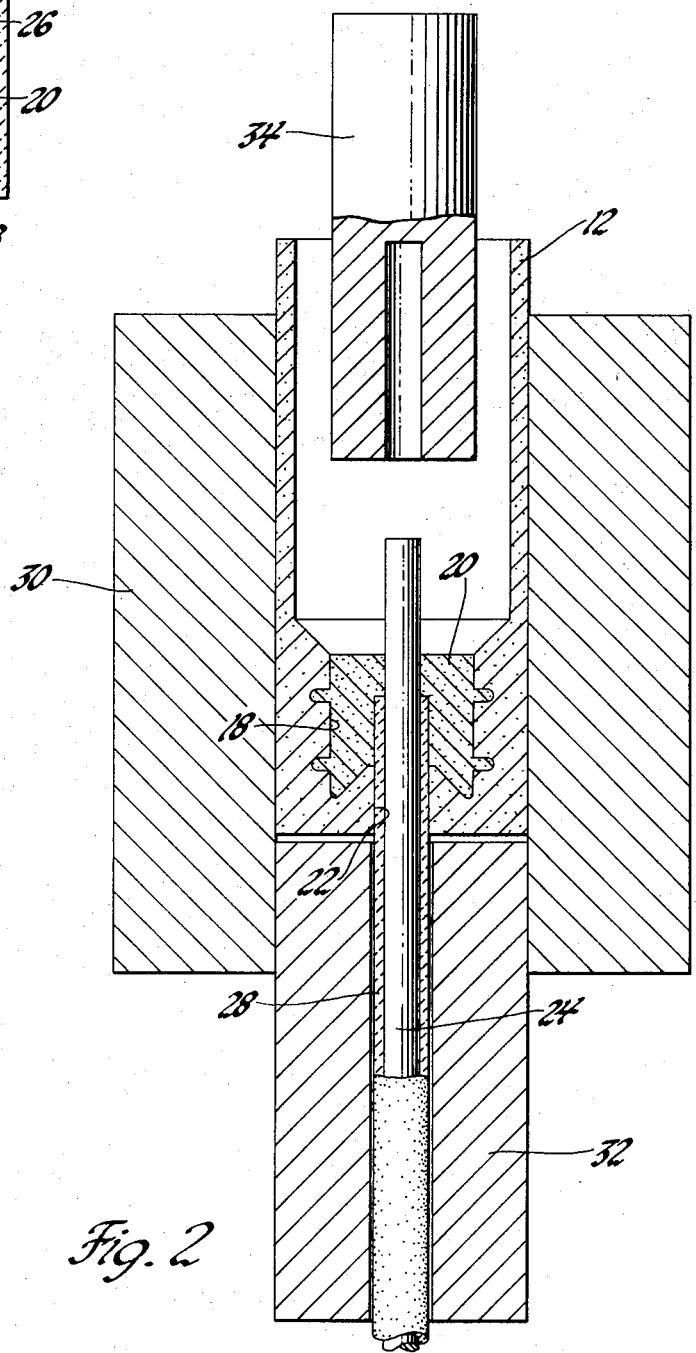
FIG. 2 is a sectioned side elevational view depicting a method of forming a seal in situ between the cell's electrodes.

In one specific example of the invention which is discussed in conjunction with FIG. 2, the well 18 of a POCO graphite cylinder 12 is filled with about 20 grams of Fisher reagent grade lithium fluoride and placed in the die 30. Based on a scanning electron microscope observation, these particles varied in the size from about $0.2 \times 10^{-4}$ inches to about $0.6 \times 10^{-4}$ inches with about 95 percent of them being less than about $0.4 \times 10^{-4}$ inches in diameter. The cylinder 12 has an outside diameter of 1¾ inches and an inside diameter of 1½ inches in the electrode region. At the bottom of the cylinder 12 the graphite is thicker and forms the well 18 having an inside diameter of 1 inch and a depth of 1 inch at its lowest point. A ⅜-inch ceramic sheath 28 is tightly fitted into the bore 22 and a ¼-inch stainless steel rod 24 tightly fitted into the sheath 28. The whole assembly is heated in an oven to 200°C. under a vacuum to completely dry the lithium fluoride. A pressure of 1000 psi is then applied by the rams 32 and 34 and the sample slowly heated to 650°C. at a rate between about 4°C./min. to about 20°C./min. When the temperature reaches about 600°–620°C. the pressure is gradually increased to about 3000 psi followed by heating the lithium fluoride to 650°C. The lithium fluoride is held at 650°C. and 3000 psi until all ram movement stops. This normally takes about 1 to 3 hours. This stand period reduces the possibility of further shrinkage in the lithium fluoride and permits some lithium fluoride to penetrate into the surface pores of the graphite and thereby become better bonded to it. After ram movement has stopped, and while the ram pressure is held at 3000 psi, the lithium fluoride is slowly cooled at a rate of about 4°C./min. The slow cooling tends to prevent cracking of the lithium fluoride. When the lithium fluoride has cooled to about 350°C., the pressure is removed for the remainder of the cooling operation. This material had a hardness of about 67 on the Rockwell 15 W scale using a Rockwell superficial hardness tester for 15 secs. with a ⅛-inch ball and a 15 Kg. load.

In another example, a ¼-inch thick insulating seal was made by hot-pressing a mixture comprising 15 weight percent lithium fluoride and 85 weight percent aluminum nitride into a ½ inch annular space between a stainless steel outer tube and a graphite inner tube. The mixture was pressed at about 3000 psi while being heated to about 900°C. The seal appeared to be in a glassy state, and was free from cracks and was tested by exposure to a lithium fluoride-saturated lithium chloride melt at about 550°C. in an inert atmosphere. The seal did not expand to the point of damaging the steel or graphite tubes and no deterioration of the seal was observed after 12 weeks of testing.

While I have disclosed my invention in terms of specific embodiments thereof, I do not intend to be limited thereto but rather only to the extend hereinafter set forth in the claims which follow.

I claim:

1. In a high temperature electro-chemical cell, having a chamber containing electrolyte, an electrode for one of the cell's reactants contacting said electrolyte, a counterelectrode for another of the cell's reactants contacting said electrolyte and spaced apart from said electrode through said electrolyte, and an electrolyte-tight insulating seal electrically isolating said electrode from said counterelectrode and defining part of said chamber, the improvement comprising: said seal consisting essentially of solid lithium fluoride and a means for mitigating the effects of lithium fluoride's thermal expansion properties; and said electrolyte comprising a mixture of lithium fluoride and a salt which when fused ionically conducts the cell's current, wherein the lithium fluoride present in the electrolyte is sufficient to substantially saturate the fused salt and the fused salt has a decomposition potential less than said lithium fluoride.

2. In a high temperature electro-chemical cell, having a chamber containing electrolyte, an electrode for one of the cell's reactants contacting said electrolyte, a counterelectrode for another of the cell's reactants contacting said electrolyte and spaced apart from said electrode through said electrolyte, and an electrolyte-tight insulating seal electrically isolating said electrode from said counterelectrode and defining part of said chamber, the improvement comprising: said seal consisting essentially of a solid sintered mass of lithium fluoride particles having a density of at least about 2.5 g/cc and being replete with a plurality of intergranular slip planes for permitting movement of the particles with respect to each other when the mass is thermally stressed; and said electrolyte comprising a mixture of lithium fluoride and a salt which when fused ionically conducts the cell's current, wherein the lithium fluoride present in the electrolyte is sufficient to substantially saturate the fused salt and the fused salt has a decomposition potential less than said lithium fluoride.

* * * * *